(No Model.)
W. STRAIT.
HARROW.
No. 578,371. Patented Mar. 9, 1897.
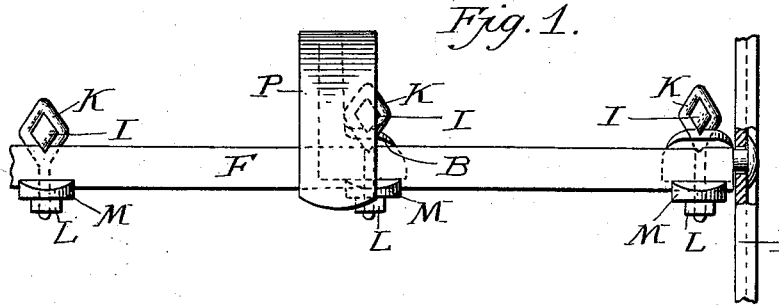
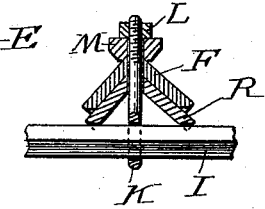
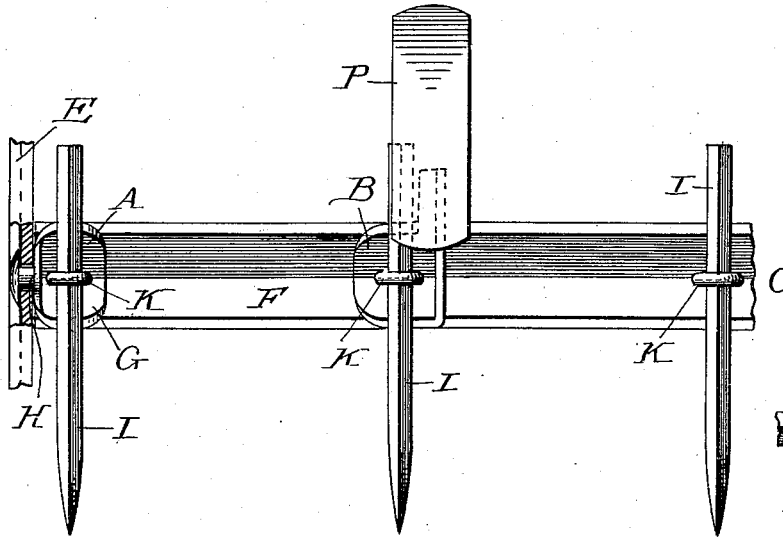
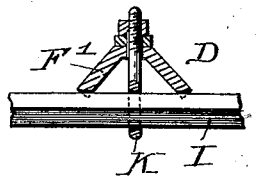
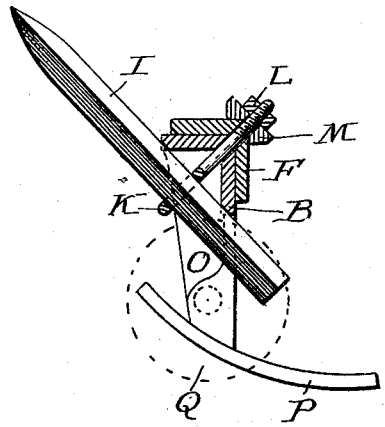
Witnesses:
William H. Reid
Albert B. Blackwood
Inventor.
William Strait
by Fenelon B. Brock
Attorney.

UNITED STATES PATENT OFFICE.

WILLIAM STRAIT, OF ELMIRA, NEW YORK.

HARROW.

SPECIFICATION forming part of Letters Patent No. 578,371, dated March 9, 1897.

Application filed May 4, 1895. Serial No. 548,132. (No model.)

*To all whom it may concern:*

Be it known that I, WILLIAM STRAIT, a citizen of the United States, residing at Elmira, in the county of Chemung and State of New York, have invented certain new and useful Improvements in Harrows; and I do declare the following to be a full, clear, and exact description of the invention, such as will enable others skilled in the art to which it appertains to make and use the same, reference being had to the letters of reference marked on the accompanying drawings, which form a part of this specification.

My invention relates to harrows.

The distinctive features are, in pivoted-tooth-bar harrows, a combined tooth-seat and pivot for the bars, a combined tooth-seat and shoe, and a novel construction and combination of the parts, the features of which will first be fully described, and then set forth in the claims.

Figure 1 represents a plan view of a portion of a tooth-bar and a frame, broken away, to which my improvements have been applied. Fig. 2 is a bottom view of the same. Fig. 3 is a cross-section through one of the tooth-bars, showing one of the teeth and the shoe in position. Fig. 4 is a detail cross-section through one of the tooth-bars and one of the other forms of the tooth-seats. Fig. 5 is a similar detail to that of Fig. 4, showing a modification.

The frame of this harrow may be constructed in any approved way. The tooth-seats A and B are applicable to pivoted-tooth-bar harrows, while the tooth-seats C and D are applicable to such harrows or to harrows having the tooth-bars rigid with the frame.

E represents a portion of the frame, and F a pivoted tooth-bar.

G is an angular tooth-seat provided with a pivot-bolt H, journaled in the frame E. The bars F are of angle-iron, and the tooth-seat G is made to conform thereto, and the pivot H projects from one side thereof. This tooth-seat is adapted to be used upon the ends of the pivoted bars F. The seat G is preferably notched upon its projecting edges, within which rests a tooth I, which is securely and adjustably clamped by an eyebolt K, having a shank which projects through the bar F and is made tight by a nut L, screwed thereon. A washer M is interposed between the nut and the angle-bar, and one of its faces is V-shaped to fit the configuration of the bar F.

The single nut L or other equivalent means secures the tooth to its seat, the seat to the bar, and the pivot H also to the bar.

The tooth-seat B is adapted for use more particularly upon intermediate portions of the bar F. Its contacting face against the bar F is similar to that of seat A, but instead of the pivot-bolt H it carries an arm O, to which is attached a shoe P or a wheel Q. (Shown in dotted line, Fig. 3.) The disposition of this tooth-seat B upon the bar F is such that when the teeth I are thrown out of the soil the shoe or wheel is brought into operative relation, so that the harrow will be carried or drawn upon the shoe or wheel.

In Fig. 4 an angular tooth-seat R is shown fitting the angle-bar F and secured thereto, together with the tooth I, by the eyebolt-clamp K.

In Fig. 5 the tooth I is shown clamped directly to the angle-bar F' without the interposition of a tooth-seat, the eyebolt K or equivalent clamp fastening the tooth directly to the angle-bar, the latter being notched at its contacting edges to prevent displacement of the tooth. This angle-bar F' instead of having the apex shown by the bar F in cross-section is flattened at that point, as shown, whereby the use of a special nut M is dispensed with.

I claim—

1. In a harrow, having a rigid perforated side bar, an angle-iron tooth-bar, an angle-iron tooth-seat having a stud projecting therefrom through the perforation in the side bar parallel with the tooth-bar, a tooth seated in said tooth-seat, and a bolt engaging the tooth and passing through the tooth-seat and tooth-bar, substantially as described.

2. In a harrow the combination with an angular tooth-bar, of an angular tooth-seat seated therein, a shoe carried by the tooth-seat and below the tooth-bar, a tooth extending above the tooth-bar, a bolt secured to the tooth and passing through the tooth-seat and tooth-bar at the junction of their angles and means for securing the said bolt.

3. In a harrow, the combination with an angle-iron tooth-seat provided with notches and with an end wall disposed at right angles to the tooth-seat and provided with a pivot-stud parallel to said seat, of a tooth and a tooth-bar secured against the opposite sides of the tooth-seat by a single bolt.

In testimony whereof I affix my signature in the presence of two witnesses.

WM. STRAIT.

Witnesses:
FENELON B. BROCK,
J. FRED. KELLEY.